United States Patent [19]

Schulz

[11] Patent Number: 5,218,107

[45] Date of Patent: Jun. 8, 1993

[54] REMOVAL OF UNDESIRABLE MATERIAL FROM WATER-SOLUBLE CELLULOSE ETHER AQUEOUS SOLUTIONS

[75] Inventor: Gary J. Schulz, Midland, Mich.

[73] Assignee: The Dow Chemical Company, Midland, Mich.

[21] Appl. No.: 814,525

[22] Filed: Dec. 30, 1991

[51] Int. Cl.$^5$ .................. C08B 11/02; C08B 11/12; C08B 11/20; C08B 11/193

[52] U.S. Cl. .................................... 536/84; 536/85; 536/90; 536/91; 536/95; 536/96; 536/97; 536/98; 536/99; 536/100

[58] Field of Search ............... 536/84, 85, 90, 91, 536/95, 96, 97, 98, 99, 100

[56] References Cited

U.S. PATENT DOCUMENTS

| | | | |
|---|---|---|---|
| 3,537,988 | 11/1970 | Marcinkowsky et al. | 210/638 |
| 3,773,752 | 11/1973 | Buchanan et al. | 536/127 |
| 3,856,569 | 12/1974 | Strong | 127/34 |
| 4,000,065 | 12/1976 | Ladha et al. | 210/652 |
| 4,129,722 | 12/1978 | Iovine et al. | 536/43 |
| 4,141,825 | 2/1979 | Conger | 204/182.3 |
| 4,296,235 | 10/1981 | Ziche | 536/85 |
| 4,299,825 | 11/1981 | Lee | 424/180 |
| 4,404,370 | 9/1983 | Bernert et al. | 536/85 |
| 4,419,490 | 12/1983 | Bayer et al. | 536/85 |
| 4,429,122 | 1/1984 | Zupancic | 536/124 |
| 4,581,446 | 4/1986 | Schulz | 536/85 |
| 4,672,113 | 6/1987 | Wallisch et al. | 536/85 |
| 4,761,186 | 8/1988 | Schara et al. | 127/71 |
| 4,819,617 | 4/1989 | Goldberg et al. | 536/98 |
| 4,988,807 | 1/1991 | Christensen et al. | 536/127 |

OTHER PUBLICATIONS

*Derwent Publication,* 87-050725/08, AKAD Wissenschaft DDR, DD-240-208-A)Aug. 16, 1985.

*Derwent Publication,* 58054D/32, Dainippon Toryo KK, J8 1029-596, Jun. 15, 1976.

*Derwent Publication,* 90027292/04, INA Shokuhin Kogyo, JO 1306-401-A, Jun. 2, 1988.

*Primary Examiner*—Nathan M. Nutter

[57] ABSTRACT

This invention is a process of removing water-soluble impurities from a water-soluble cellulose ether aqueous solution containing such water-soluble impurities comprising treating an aqueous solution comprising a water-soluble cellulose ether and a water-soluble impurity by means of ultrafiltration and diafiltration at conditions effective to produce a treated aqueous solution having a reduced concentration of the water-soluble impurity and an increased concentration of the water-soluble cellulose ether.

14 Claims, No Drawings

REMOVAL OF UNDESIRABLE MATERIAL FROM WATER-SOLUBLE CELLULOSE ETHER AQUEOUS SOLUTIONS

BACKGROUND OF THE INVENTION

The field of this invention is the removal of water-soluble impurities from an aqueous solution containing a water-soluble cellulose ether and a water-soluble impurity.

Water-soluble cellulose ethers are used for their many different properties and are employed in a variety of applications such as as thickeners, binders, film formers, water-retention aids, suspension aids, surfactants, lubricants, protective colloids, or emulsifiers, and are used in a variety of end uses such as foods, cosmetics, pharmaceuticals, latex paints, construction products, or ceramics.

A problem encountered by those that produce and consequently those that use the water-soluble cellulose ethers is the presence of impurities. Typically, cellulose ethers are prepared by reacting alkali cellulose with one or more etherifying agents. The etherifying agents are generally alkylhalides, alkylene oxides, halocarboxylic acids or dialkyl sulfates. The etherifying agents are highly reactive and can form impurities upon reacting with each other, water, or the alkali on the cellulose. The impurities formed in these side reactions must be removed before the cellulose ether can be employed in certain end uses, for example, in the pharmaceutical and food fields.

In view of the fact that many water-soluble cellulose ethers are insoluble in hot water, some of the impurities in the final product can be removed by washing the cellulose ether product in hot water at a temperature above the gel point, i.e., the temperature at which the cellulose ether precipitates. Typically, such a procedure is performed by spreading the cellulose ether product on a large filter, and then spraying the product with hot water. However, an amount of the cellulose ether remains soluble in the hot water. Moreover, for those cellulose ethers which have gel points close to the boiling point of water at standard pressure, a larger portion of the cellulose ether remains soluble. The portion of the cellulose ether which remains soluble is washed away in the hot water wash causing product loss. For example, it is typical to lose about 10 to about 30 percent of low viscosity hydroxypropyl methylcellulose and about 2 to about 10 percent of high viscosity hydroxypropyl methylcellulose The low viscosity species typically experience higher losses because, generally, a larger portion of the low viscosity species is soluble in water at any given temperature.

The problem of product loss in the hot water washing process is aggravated by the fact that a large quantity of water is required to remove the desired amount of impurities. Typically, from about 5 to about 20 parts of water are required to remove one part of the impurities. This large amount of water removes a correspondingly large amount of cellulose ether product along with the impurities. Additionally, when this large amount of water containing the impurities and products is discharged, large costs are incurred to decontaminate the water.

U.S. Pat. No. 4,404,370 discloses that cellulose ethers can be purified in a countercurrent process. In such a process, a suspension of cellulose ether is dropped onto a conveyor belt, and washed continuously with a water/alcohol purifying agent. The purifying agent is sprayed onto the cellulose ether from a number of ports, and filtered off. Some of the filtered purifying agent is recycled and used as the purifying agent at a different port. Such a process has the advantage of efficient use of the purifying agent, but does not provide a means for controlling other process parameters such as temperature and pressure, and requires the addition of a purifying agent which is different from the suspension agent.

U.S. Pat. No. 4,581,446 teaches a process of removing solvent-soluble impurities from a cellulose ether composition. This process comprises providing a functionally effective thickness of a cellulose ether composition in a filtration device. The cellulose ether composition is contacted with an extracting solution comprising a solvent for the impurities, in a manner such that the extracting solution can migrate through the cellulose ether composition and through the filtration device. The extracting solution is allowed to migrate through the thickness of the cellulose ether composition such that substantial thickness of the cellulose ether is maintained in the filtration device, and a gradient impurity concentration is effected through the thickness of the cellulose ether composition. This process, however, is expensive and tedious to operate and maintain and does not allow for recovery of the low molecular weight cellulose ether losses as a separate product.

U.S. Pat. No. 4,672,113 teaches a process for the purification treatment of liquid reaction and washing media obtained in the preparation of cellulose ethers. This process includes the ultrafiltration of a residue of a distillation procedure, wherein the residue substantially comprises salt, a cellulose constituent and medium- and higher-molecular weight ethylene glycol derivatives. The permeate which is collected from the ultrafiltration can be fed directly to a waste-water purifying plant. The concentrate which is collected from the ultrafiltration substantially comprises the salt and the cellulose constituents in approximately equal proportions.

In view of the disadvantages of known methods, it is desirable to provide a process for removing water-soluble impurities from an aqueous solution containing a water-soluble cellulose ether and a water-soluble impurity in an efficient, versatile system, in which substantial amounts of the impurities are removed without experiencing substantial cellulose ether product losses.

The present invention solves this problem by providing a process which removes water-soluble impurities from an aqueous cellulose ether solution thereby generating a concentrated, purified aqueous cellulose ether solution and an aqueous impurity solution.

SUMMARY OF THE INVENTION

This invention is a process of removing water-soluble impurities from a water-soluble cellulose ether aqueous solution containing such water-soluble impurities comprising treating an aqueous solution comprising a water-soluble cellulose ether and a water-soluble impurity by means of ultrafiltration and diafiltration at conditions effective to result in a treated aqueous solution having a reduced concentration of the water-soluble impurity and an increased concentration of the water-soluble cellulose ether.

DETAILED DESCRIPTION

The present invention is useful in removing water-soluble impurities from an aqueous solution containing a water-soluble cellulose ether and a water-soluble impurity. Water-soluble cellulose ethers which are useful in the present invention include such known cellulose ethers as methylcellulose, hydroxypropyl methylcellulose, hydroxypropyl cellulose, hydroxyethyl methylcellulose, hydroxybutylmethyl cellulose, ethyl cellulose, or carboxymethyl cellulose.

Water-soluble cellulose ethers can be prepared from any of a variety of known methods, such as those disclosed in, for example, U.S Pat. Nos. 3,342,805: 3,388,082: 3,709,876: and 4,477,657. Low-molecular weight, low-viscosity cellulose ethers which have a viscosity of less than about 10,000 centipoise (cps) (10,000 mPa.s) as a 2 weight percent aqueous solution at 20° C., especially find the process of the present invention useful. Generally, the molecular weight of a cellulose ether product is determined by the molecular weight of the cellulose pulp employed in its preparation. The molecular weight can also be controlled, for example, by catalytic or oxygen degradation processes, as disclosed in U.S. Pat. No. 4,410,693.

Typically, cellulose ethers are prepared by reacting ground cellulose pulp derived from wood, oat hulls or cotton with a concentrated aqueous alkali metal hydroxide solution (hereinafter "caustic solution"). Preferably, the caustic solution is a sodium hydroxide solution containing at least 20 weight percent sodium hydroxide. The caustic solution breaks up the crystalline structure of the cellulose, catalyzes the etherification reaction and attaches the ether groups to the cellulose.

Etherifying agents typically used in the preparation of cellulose ethers are an alkylene oxide and another agent which is not an alkylene oxide, for example an alkylhalide, halocarboxylic acid, or dialkyl sulfate. However, when preparing ternary-substituted cellulose ethers, a second alkylene oxide can be employed. The agents are chosen based on the type of cellulose ether product desired. For example, propylene oxide and methylene chloride are typically chosen to prepare hydroxypropyl methylcellulose. The amount of the etherifying agents employed depend on the extent of substitution on the cellulose ether product desired. Generally, a larger amount of the etherifying agents are required to produce a higher-substituted cellulose ether product.

As used herein, the term "water-soluble cellulose ether product" refers to the desired water-soluble cellulose ether reaction product between the alkali cellulose and the etherifying agents. Such water-soluble cellulose ether products can be moist from the liquid reagents employed in their preparation, or somewhat dry if the liquid has been removed.

In the present specification and claims, the term "water-soluble impurity(ies)" is meant to represent any material or compound other than water or the water-soluble cellulose ether present in an aqueous solution. Such materials or compounds are typically contaminants that interfere with the desired use of a water-soluble cellulose ether product. Such water-soluble impurities include alkali metal salts such as sodium chloride or potassium chloride, glycol ethers, ethers, alcohols such as methanol or ethanol, and unreacted etherifying agents. These water-soluble impurities can lie in solution with or independently of a solution which forms a moist water-soluble cellulose ether product. Alternatively, the water-soluble impurities can be solid. The solution containing the water-soluble impurities can be on the surface of the water-soluble cellulose ether product as well as in void spaces inside the solid water-soluble cellulose ether product. Depending on the types of reagents employed during preparation of the water-soluble cellulose ether product, such a solution can be an aqueous or organic solution. If aqueous reagents are employed in preparing the cellulose ether, the aqueous solution containing the impurities can be in the form of a brine solution. Typically, such a brine solution will contain water which is introduced into the reaction when a caustic solution is added.

The water-soluble cellulose ether product may be isolated from the aqueous or organic solution by filtration. Because many water-soluble cellulose ethers thermally gel at elevated temperatures, the water-soluble cellulose ether product is typically washed with a washing liquor, such as water, at nearly 100° C. in order to minimize product losses while removing impurities. However, low molecular weight water-soluble cellulose ether components of the product, generally comprising approximately 0.1 weight percent to 20 weight percent of the total product yield, are lost due to their high solubility. Such a loss of the low molecular weight water-soluble cellulose ether component into the washing liquor results not only in poor recoveries of the desired product but also in increased waste treatment costs.

Typically, a water-soluble cellulose ether product washing liquor contains low molecular weight water-soluble cellulose ether product, sodium chloride, and other water-soluble reaction products such as glycols. It has been discovered that membranes can be used to concentrate the water-soluble cellulose ether product in a water-soluble cellulose ether product washing liquor by ultrafiltration and the water-soluble impurities can be washed from this solution to a desired concentration by diafiltration.

According to the process of the present invention, a water-soluble cellulose ether containing a water-soluble impurity, or a mixture of water-soluble cellulose ethers containing water-soluble impurities, may be mixed with an aqueous solvent to form an aqueous solution before treatment by means of ultrafiltration and diafiltration. Preferably, the aqueous solvent is simply water, although an aqueous solvent which is up to about 20 weight percent alcohol can also be used, depending on the particular water-soluble cellulose ether to be treated in the process.

Alternatively, the aqueous solution to be treated by the process of the present invention may comprise a solution resulting from a process used to prepare a desired water-soluble cellulose ether product. Such an aqueous solution will typically be a production waste stream comprising the desired water-soluble cellulose ether product, impurities, and solvents.

As used herein, the term "ultrafiltration" is meant to describe a separation technique using a membrane device which separates different components that are in solution. Such a separation technique generally separates a permeate from a solution by forcing the permeate to flow through a membrane by applying a pressure greater than the normal osmotic pressure. Preferably, the ultrafiltration separation process involves permeates whose molecular dimensions are ten or more times larger than those of the solvent and are below $1 \times 10^{-4}$ m in size.

An ultrafiltration membrane should be chosen to have a pore size that is large enough to allow the water-soluble impurities to pass through with minimal osmotic pressure but small enough to retain the water-soluble cellulose ether being concentrated in the aqueous solution that is being treated. There are many commercially available ultrafiltration membranes which should be acceptable for use in the process of the present invention.

Preferably, a filtration device employed in the process of the present invention comprises a means for controlling the temperature and/or pressure of the process. Such a controlling means provides a versatility to the process. For example, for those cellulose ethers which are more insoluble at high temperatures, the temperature can be increased to insolubilize those cellulose ethers.

An example of a membrane cartridge useful in the process of the present invention is a model number NF40-2540 membrane, available from the FilmTec Corporation. The NF40-2540 membrane exhibits a high rejection of divalent ions and organics having molecular weights above 400, but it allows monovalent ions to pass to a high degree. Propylene glycol, dipropylene glycol, and propylene glycol methyl ether also pass to a high degree.

Diafiltration is a process where a solute, typically water, is injected into a system at a rate equal or less than the filtration rate being used on the system. The net effect is to wash out the soluble components that will pass through the membrane while retaining the components that will not pass through the membrane.

In the present invention, a solute, such as water, is added to a recirculating loop in order to wash out salt and other water-soluble impurities by diafiltration. During diafiltration, the solute addition rate is typically set substantially equal to the rate of loss of permeate through the membrane so that diafiltration is done independently of concentration of the water-soluble cellulose ether in the aqueous solution. Diafiltration is generally most efficient when the volume of concentrate of water-soluble cellulose ether is lowest.

The aqueous solution comprising a water-soluble cellulose ether and a water-soluble impurity is passed through an ultrafiltration membrane device at such a flow rate that a desired concentration of water-soluble cellulose ether is achieved. The ultrafiltration membrane should be of a size and used at conditions effective to achieve desired concentration levels of the water-soluble cellulose ether and the water-soluble impurity in the treated aqueous solution. As used herein, the term "treated aqueous solution" is meant to mean an aqueous solution which has been treated by both ultrafiltration and diafiltration according to the process of the present invention. As such, a treated aqueous solution should have a higher concentration of the water-soluble cellulose ether and a lower concentration of the water-soluble impurity than that of the original, untreated aqueous solution.

In the present specification and claims, the terms "effective conditions" and "conditions effective" ar meant to represent the conditions needed to achieve desired results in the present process. Such conditions at which the process of the present invention may be effectively operated will depend upon several factors, as discussed below, and, as such, will vary from process to process.

Unexpectedly, it has been found that as the water-soluble cellulose ether concentration increases in the aqueous solution during ultrafiltration, the permeate flux will typically decrease. Conversely, as the concentration of certain water-soluble impurities, such as sodium chloride and other salts, is decreased in the aqueous solution, the permeate flux increases.

Thus, diafiltration typically becomes necessary in order to increase permeate flux. As such, diafiltration is done with ultrafiltration in combination either batch-wise or as a continuous process. Preferably, the ultrafiltration and diafiltration are done in a batch-wise combination. When done in a batch-wise combination, it is preferable that the ultrafiltration and diafiltration be done alternately a number of times until the desired concentration of water-soluble cellulose ether and water-soluble impurities is achieved. The specific number of times that the ultrafiltration and diafiltration should be done alternately will depend on the overall process conditions and the final desired concentration of water-soluble cellulose ether and water-soluble impurities. Preferably, the ultrafiltration and diafiltration are alternately done at least three times each.

Such a process using a combination of ultrafiltration and diafiltration has a dual effect in that it increases the volume of permeate but also lowers the water-soluble impurity level in the aqueous solution. Therefore, the water-soluble cellulose ether concentration typically is increased as the water-soluble impurity concentration is decreased. The water-soluble impurity concentration can typically be washed to any desired level as long as the extra diafiltration solute can be tolerated as well as the associated yield losses of the water-soluble cellulose ether. With the combination of diafiltration and ultrafiltration, a treated aqueous solution can be generated that is substantially purified of water-soluble impurities and the water-soluble cellulose ether concentrated such that the water-soluble cellulose ether can be recovered as a solution or a dry product.

The amount of water-soluble impurity in the aqueous solution and the amount of water-soluble impurity to be removed from the aqueous solution will both affect the process conditions of the present invention. In general, the amount of removal of the water-soluble impurity is a function of the contact time of the aqueous solution with the ultrafiltration membrane, with longer contact times necessary to achieve a treated aqueous solution with a more highly concentrated water-soluble cellulose ether.

Although the water-soluble cellulose ether concentration in the permeate may be low, such as, for example, less than 0.1 weight percent, the overall loss of the water-soluble cellulose ether can be quite high. The overall loss of water-soluble cellulose ether in the permeate, or alternatively, the yield of recovered water-soluble cellulose ether in the treated aqueous solution, will depend on the initial concentration of the water-soluble cellulose ether in the aqueous solution. For example, for an aqueous solution with an initial water-soluble cellulose ether concentration of 0.1 weight percent that results in a permeate with a water-soluble cellulose ether concentration of 0.09 weight percent, the water-soluble cellulose ether recovery yield is only 10 percent. However, with the same permeate level but with an initial water-soluble cellulose ether concentration of 0.3 weight percent, the recovery yield is 70 percent. Alternatively, with the permeate having a water-soluble cellulose ether concentration of about 0.02 percent and the aqueous solution with an initial water-soluble cellulose ether concentration of about 0.3 weight percent the recovery yield is 94 percent. A rigorous material balance using these relationships is the only way to calculate the actual yields.

It has also been found that the loss of water-soluble cellulose ether in the permeate may vary with water-soluble impurity type and concentration and water-soluble cellulose ether type. In particular, the loss of water-soluble cellulose ether has been found to be dependent upon the glycol concentration in the aqueous solution.

The desired level of water-soluble impurity in the treated aqueous solution or, alternatively, the amount of water-soluble impurity to be removed from the aqueous solution during treatment will depend on the specific end use for which the water-soluble cellulose ether is intended. Thus, a desired level of removal of the water-soluble impurity will be dictated by specific consumer or industrial need requirements of the final product and, as such, will vary from final product to final product.

The concentration of the water-soluble cellulose ether is preferably from about 1 to about 25 weight percent, more preferably from about 15 to about 25 weight percent, of the treated aqueous solution. The concentration of the water-soluble impurity is preferably from 0 to about 26 weight percent, more preferably from about 0.01 to about 2 weight percent, of the treated aqueous solution.

If the aqueous solution treated by the process of the present invention is a water-soluble cellulose ether product washing liquor, the recovered water-soluble cellulose ether will typically have very low viscosities (as measured as a 2 weight percent aqueous solution at 20° C.) which will typically be lower than the viscosity of the parent water-soluble cellulose ether product from which it came. If the recovered water-soluble cellulose ether is to be added back to the parent water-soluble cellulose ether product, this has the effect of slightly lowering the apparent viscosity of the parent water-soluble cellulose ether. Consequently, the parent water-soluble product would have to be made with a slightly higher viscosity to counteract this effect. Alternatively, such low-viscosity, recovered water-soluble cellulose ether could be isolated as a separate product.

For a desired amount of removal of water-soluble impurity, the required contact time can be achieved by numerous combinations of flow rate and membrane size. Typically, the permeate flow rates through the membrane range from about 0.001 to about 20 gallons per day per square foot of membrane (gal/day/ft$^2$) ($4 \times 10^{-5}$ to 0.8 cubic meters per day per square meter of membrane (m$^3$/day/m$^2$)), preferably from about 2 to about 12 gal/day/ft$^2$ (0.08 to 0.48 m$^3$/day/m$^2$).

The present process is typically operated at temperatures of about 15° to about 50° C. Elevated temperatures of about 50° to about 60° C. are effective, but at higher temperatures some of the water-soluble cellulose ether may precipitate or gel. Such gelling or precipitation could cause the ultrafiltration membrane to be blocked, thereby inhibiting the flow of the aqueous solution through the membrane. In instances where one would not be concerned with the water-soluble cellulose ether gelling, elevated temperatures are workable.

Typically, as temperature is increased, the permeate flux rate increases to a point and then drops off. The water-soluble cellulose ethers useful in the present invention typically thermally gel, which may cause the decrease in flux as the thermally gelled cellulose ether fouls the surface of the membrane. Furthermore, some membranes are not chemically stable above certain temperatures, so operating at a temperature higher than this critical temperature is undesirable. For example, the FilmTec Corporation's NF40-2540 membrane is not chemically stable above 45° C. and, as such, should not be operated above this temperature. When using such a FilmTec Corporation NF40-2540 membrane, it may be beneficial to operate up to 45° C. to maximize flux in some cases, but in other cases the temperature should be less than 35° C. In practice, it would probably be most practical to make a design based on 25° to 35° C. which should allow for all concentrations and products without fouling due to thermal gelling.

The aqueous solution should not be so viscous that reasonable flow rates cannot be achieved without resorting to excess process pressures to force the aqueous solution through the membrane. Differential pressure across the membrane will also affect the permeate flux of the aqueous solution being treated. Typically, the permeate flux is proportional to the differential pressure. Typically accepted pressures to aid in the process are from about 100 to about 1500 psig ($7 \times 10^5$ to $1 \times 10^7$ Pa), preferably from about 300 to about 800 psig ($2 \times 10^6$ to $6 \times 10^6$ Pa).

The differential pressure to be used will depend on the ultrafiltration membrane to be used. For example, the recommended operating differential pressure is 300 psi ($2 \times 10^6$ Pa) when using a FilmTec Corporation NF40-2540 model number membrane. It is possible to operate up to about 400 psi ($3 \times 10^6$ Pa) without damage to such a membrane, but at pressures greater than about 300 psi ($2 \times 10^6$ Pa) it becomes possible for the water-soluble cellulose ether to be driven into the pores of the membrane to cause fouling. Pressures above about 400 psi ($3 \times 10^6$ Pa) can cause damage to this membrane.

The pH of the aqueous solution may also be a factor in the efficiency of the process. It has been found that if the pH of the aqueous solution is too low the efficiency of the process could be reduced. The pH range necessary for effective removal of water-soluble impurities from the aqueous solution will be dependent on the specific water-soluble cellulose ether to be treated. The preferred pH of the water-soluble cellulose ether aqueous solution is typically between about 4 and about 7.

The following examples illustrate the present invention and the manner by which it can be practiced but, as such, should not be construed as limitations upon the overall scope of the same.

EXAMPLES

A wrapped 2.5 inches ($6.4 \times 10^{-2}$ m) diameter by 40 inches (1 m) long membrane cartridge with about 23 sq. ft. (2 m$^2$) of filter area, available from the FilmTec Corporation as a model number NF40-2540 membrane, is used. The membrane cartridge is fitted into a pressure vessel tube designed to accept recirculating concentrate and filtrate (permeate). The membrane vessel tube is installed on a skid with a pump and instruments. The skid is then piped in conjunction with exiting tanks and piping.

The membrane filter is operated batch-wise. A 2,070 pounds (939 kg) sample of a hydroxypropyl methylcellulose (HPMC) waste brine is received in drums from a cellulose ether production plant. The product HPMC from which the waste brine is taken has a viscosity of about 35 cps (35 mPa s) as a 2 weight percent aqueous solution at 20° C. (available from The Dow Chemical Company as METHOCEL TM K35 hydroxypropyl methylcellulose).

The brine solution is neutralized with concentrated hydrochloric acid inasmuch as the membrane cartridge cannot tolerate a pH above 9 or below 4. The brine solution is then pumped into a 300 gallon (1.1 m³) feed tank. The brine solution is filtered through a 25×10⁻⁶ m cartridge filter as it is transferred from the drums.

The brine solution is fed through the membrane vessel tube to concentrate the water-soluble cellulose ether from 1.6 weight percent to 4.0 weight percent HPMC at a 10.7 weight percent sodium chloride concentration.

Cellulose ether concentrations are determined by allowing the cellulose ether to react with phenol and sulfuric acid and subsequently performing a colorimetric determination. All cellulose ether concentrations are reported by this technique. However, all reported cellulose ether concentrations have a ±20 percent error factor due to impurities interfering with the concentration analysis. Sodium chloride levels are determined by titration with silver nitrate.

The HPMC waste brine is recirculated at 3.3 gallons per minute (1.3×10⁻² m³ per minute) with a pressure drop of 100 to 600 psi (7×10⁵ to 4×10⁶ Pa), but more typically at 300 psi (2×10⁶ Pa), across the membrane cartridge and at a temperature of 20° to 45° C. Permeate flux (the rate at which brine passes through the membrane based on 25° C.) is started at 10 gal/day/ft² (0.4 m³/day/m²) and decreases to 6.4 gal/day/ft² (0.3 m³/day/m²).

Water, 700 pounds (318 kg), is then added to a recirculating loop in order to wash out salt and other water-soluble impurities by diafiltration. During diafiltration, the water addition rate is set equal to the permeate rate so that diafiltration is done independently of concentration of the HPMC. Diafiltration is continued until the sodium chloride level is reduced to 4.1 weight percent of the brine solution, at which time the permeate flux has increased to 11.9 gal/day/ft² (0.5 m³/day/m²).

Concentration of the HPMC is then resumed to concentrate the brine solution to 11.4 weight percent HPMC, at which time the permeate flux has decreased to 5.0 gal/day/ft² (0.2 m³/day/m²)

Diafiltration is then continued for an additional 1,134 pounds (514 kg) water. This reduces the sodium chloride level to 0.4 weight percent of the brine solution, at which time the permeate flux has increased to 7.1 gal/day/ft² (0.3 m³/day/m²).

Concentration of the HPMC is then resumed until the HPMC concentration reaches 15.2 weight percent HPMC of the brine solution, at which time the permeate flux has decreased to 3.7 gal/day/ft² (0.15 m³/day/m²).

Diafiltration is resumed again using 224 pounds (102 kg) water to reduce the sodium chloride level to 0.07 weight percent of the brine solution, at which time the permeate flux has increased to 10 gal/day/ft² (0.4 m³/day/m²)

Concentration of the HPMC is again resumed until the HPMC concentration reaches 19.6 weight percent of the brine solution, at which time the permeate flux has decreased to 2.4 gal/day/ft² (0.1 m³/day/m²). A portion of this concentrate is dried to yield a solid HPMC product with 0.7 weight percent salt. Another portion of the concentrate is recovered by adding about 5 g of the concentrate to about 22.2 g of wet (55 weight percent HPMC) METHOCEL ™ K35 hydroxypropyl methylcellulose washed filter cake. The concentrate and washed filter cake are mixed and dried, representing a recovered yield.

Total cellulosics can be determined by drying samples to determine total solids and correcting for salt. Infrared and carbon-13 nuclear magnetic resonance speotroscopy (NMR) and size exclusion chromatography show the contents of the concentrate to be cellulosic with no significant residues other than salt.

The process described above is then used on the following HPMC waste brine solutions:

a. A waste brine solution wherein the product HPMC from which the waste brine is taken has a viscosity of about 4,000 centipoise (4,000 mPa.s) as a 2 weight percent aqueous solution at 20° C. (available from The Dow Chemical Company as METHOCEL ™ K4M hydroxypropyl methylcellulose).

b. A waste brine solution wherein the product HPMC from which the waste brine is taken has a viscosity of about 4,000 centipoise (4,000 mPa.s) as a 2 weight percent aqueous solution at 20° C. (available from The Dow Chemical Company as METHOCEL ™ E4M hydroxypropyl methylcellulose).

c. A waste brine solution wherein the product HPMC from which the waste brine is taken has a viscosity of about 4,000 centipoise (4,000 mPa s) as a 2 weight percent aqueous solution at 20° C. (available from The Dow Chemical Company as METHOCEL ™ F4M hydroxypropyl methylcellulose).

Several properties of the recovered water-soluble cellulose ethers are shown in Table I. The substitutions of the recovered material are close to the specifications of the parent products. The actual substitution of the parent products is not known, however, so it is not conclusive whether any differences are due to the recovered low molecular weight fraction or due to the parent material.

TABLE I

| | Analysis of Recovered Cellulose Ether | | | |
|---|---|---|---|---|
| Parent Brine Type | 2 Percent Viscosity (cps (mPa · s)) | Percent NaCl | Percent Methoxyl Substitution | Percent Propoxyl Substitution |
| K35 | 1.70 | .03 | 22.01 | 10.76 |
| | (28–42) | (5.0) | (19–24) | (7–12) |
| K4M | 2.02 | .06 | 21.89 | 10.97 |
| | (3,500–5,600) | (2.0) | (19–24) | (7–12) |
| E4M | 1.64 | 3.29 | 24.38 | 13.05 |
| | (3,500–5,600) | (2.0) | (28–30) | (7–12) |
| F4M | 1.44 | 1.27 | 25.50 | 6.26 |
| | (3,500–5,600) | (1.5) | (27–30) | (4–7.5) |

( ) Indicates Specification Range or Maximum for Parent Product

Testing of the recovered water-soluble cellulose ethers in tape joint compounds, ceramic tile mortar, and paint showed no significant performance differences from the parent water-soluble cellulose ether products.

What is claimed is:

1. A process of removing a water-soluble purity from a water-soluble cellulose ether aqueous solution containing such water-soluble impurity comprising treating an aqueous solution comprising a thermally-gelling, water-soluble cellulose ether and an alkali metal salt impurity;
   a. by means of ultrafiltration wherein the permeate flux decreases during the use of the means of ultrafiltration; and
   b. by means of diafiltration wherein the permeate flux increases during the use of the means of diafiltration at conditions effective to produce a treated aqueous solution having a reduced concentration of the alkali metal salt impurity and an increased concentration of the thermally-gelling, water-soluble cellulose ether.

2. The process of claim 1 wherein the thermally-gelling, water-soluble cellulose ether is methylcellulose, hydroxypropyl methylcellulose, hydroxypropyl cellulose, hydroxyethyl methylcellulose, or hydroxybutylmethyl cellulose.

3. The process of claim 1 wherein the aqueous solution is a waste stream from the production of a thermally-gelling, water-soluble cellulose ether.

4. The process of claim 1 wherein the alkali metal salt impurity is sodium chloride.

5. The process of claim 1 wherein water is used as a solute during diafiltration.

6. The process of claim 1 wherein the treated aqueous solution has an alkali metal salt impurity concentration from 0 to about 26 weight percent.

7. The process of claim 1 wherein the treated aqueous solution has a thermally-gelling, water-soluble cellulose ether concentration from about 1 to about 25 weight percent.

8. The process of claim 1 wherein the aqueous solution is a thermally-gelling, water-soluble cellulose ether product washing liquor.

9. The process of claim 1 wherein a solute addition rate during diafiltration is substantially equal to the rate of loss of permeate.

10. The process of claim 1 wherein the thermally-gelling, water-soluble cellulose ether has a viscosity of less than about 10,000 centipoise (10,000 mPa·s as a 2 weight percent aqueous solution at 20° C.

11. The process of claim 1 wherein the ultrafiltration and diafiltration are each done batchwise.

12. The process of claim 11 wherein the ultrafiltration and diafiltration are alternately done three times each.

13. The process of claim 1 wherein the permeate flow rate of the aqueous solution is from about 0.001 to about 20 gallons per day per square foot of membrane ($4 \times 10^{-5}$ to 0.8 cubic meters per day per square meter of membrane).

14. A process of removing sodium chloride form a water-soluble cellulose ether aqueous solution containing such sodium chloride comprising treating an aqueous solution comprising a thermally-gelling, water soluble cellulose ether and sodium chloride by means of ultrafiltration and diafiltration at conditions effective to produce a treated aqueous solution having a reduced concentration of the sodium chloride and an increased concentration of the thermally-gelling, water-soluble cellulose ether, wherein the ultrafiltration and diafiltration are alternately done batch-wise at least three times each and wherein the sodium chloride is present in the treated aqueous solution at a concentration of from 0 to about 26 weight percent of the treated aqueous solution.

* * * * *